(12) United States Patent
Chang

(10) Patent No.: US 8,624,866 B2
(45) Date of Patent: Jan. 7, 2014

(54) TOUCH METHOD AND DEVICE FOR DISTINGUISHING TRUE TOUCH

(75) Inventor: Chin-Fu Chang, Taipei County (TW)

(73) Assignee: Egalax_Empia Technology Inc., Taipei (TW)

( * ) Notice: Subject to any disclaimer, the term of this patent is extended or adjusted under 35 U.S.C. 154(b) by 1022 days.

(21) Appl. No.: 12/500,001

(22) Filed: Jul. 9, 2009

(65) Prior Publication Data

US 2010/0007631 A1    Jan. 14, 2010

Related U.S. Application Data

(60) Provisional application No. 61/103,626, filed on Oct. 8, 2008.

(30) Foreign Application Priority Data

Jul. 9, 2008  (TW) .............................. 97125842 A

(51) Int. Cl.
  *G06F 3/044*   (2006.01)
(52) U.S. Cl.
  USPC ....................... 345/174; 178/18.06

(58) Field of Classification Search
  USPC ..................... 345/173–174; 178/18.01, 18.06
  See application file for complete search history.

(56) References Cited

U.S. PATENT DOCUMENTS

| | | | | |
|---|---|---|---|---|
| 2007/0229464 | A1* | 10/2007 | Hotelling et al. | 345/173 |
| 2007/0296709 | A1* | 12/2007 | GuangHai | 345/173 |
| 2008/0150906 | A1* | 6/2008 | Grivna | 345/173 |
| 2008/0309633 | A1* | 12/2008 | Hotelling et al. | 345/173 |
| 2009/0284495 | A1* | 11/2009 | Geaghan et al. | 345/174 |

* cited by examiner

*Primary Examiner* — Hong Zhou
(74) *Attorney, Agent, or Firm* — WPAT, PC; Justin King

(57) ABSTRACT

This invention discloses a touch device for distinguishing true touch. The touch device includes a touch screen, a driving unit, and a sensing unit. The touch screen has a plurality of first conductive lines and second conductive lines where the first and second conductive lines are electrically isolated from each other and stacked to form a plurality of coupling intersections. The driving unit operatively drives the first conductive lines. The sensing unit determines the first conductive lines touched or approached by a plurality of objects and also determines the coupling intersections touched or approached by the objects when the first conductive lines touched or approached by the objects are driven. By doing so, the true touch and the false touch caused by the objects can be determined and distinguished.

30 Claims, 6 Drawing Sheets operatively driving a plurality of first conductive lines of the touch screen, wherein the first conductive lines and a plurality of second conductive lines are electrically isolated from each other and stacked to constitute a plurality of coupling intersections
312

determining the first conductive lines touched or approached by a plurality of objects
314

simultaneously determining the coupling intersections touched or approached by the objects when the first conductive lines touched or approached by the objects are driven
316

FIG. 3A operatively driving a plurality of first conductive lines, wherein the first conductive lines and a plurality of second conductive lines are electrically isolated from each other and stacked to constitute a plurality of coupling intersections
322

determining the first conductive lines touched or approached by a plurality of objects, wherein the first conductive lines touched or approached by the objects are a plurality of selected first conductive lines
324

operatively driving the selected first conductive lines, and determining operatively the coupling intersections touched or approached by the objects when the selected first conductive lines are driven
326

TOUCH METHOD AND DEVICE FOR DISTINGUISHING TRUE TOUCH

BACKGROUND OF THE INVENTION

1. Field of the Invention

The present invention relates to a touch method and device, and more particularly, to a touch method and device distinguishing true touch.

2. Description of the Prior Art

Referring to FIG. 1, a diagram depicting a prior-art touch panel with multi-touch operations and a capacitance image is shown. A touch panel 110 has a plurality of first conductive lines 112 and a plurality of second conductive lines 114. The first and second conductive lines are perpendicularly stacked on and electrically isolated from each other. When a sensing signal (not shown) is input to one of the first conductive lines 112, it creates a plurality of capacitive coupling with all of the second conductive lines at intersecting points, thereby determining the electrical characteristics of the intersecting points based on the current or voltage on all of the second conductive lines. Each of the first conductive lines 112 are sequentially provided with the sensing signal, and the electrical characteristics of all the intersecting points can be determined by the sensing process just described.

When a human, naturally grounded, touches or gets near a sensing location (an intersecting point) with his/her finger tip, the coupling capacitance of the sensing location is influenced, that is, current or voltage thereof is changed. However, when there are two touch points $P_1$ and $P_2$ on the touch panel 110, not only the current or voltage at touch points $P_1$ and $P_2$ would change, but also the current or voltage at two other intersecting points $G_1$ and $G_2$ (forming the so-called "Ghost points"). Thus, two touch points $P_1$ and $P_2$ will result in the current or voltage change in four intersecting points on the touch panel 110 (e.g. $(X_1, Y_4)$, $(X_3, Y_6)$, $(X_1, Y_6)$ and $(X_3, Y_4)$) and the actual touch points cannot be identified. Explain further from the capacitance image 120, the capacitance image wave $P_1W_1$ of a touch point $P_1(X_1, Y_4)$ is different from the capacitance image waves $G_1W_1$ and $G_2W_1$ of intersecting points $G_1(X_1, Y_6)$ and $G_2(X_3, Y_4)$ by $d_1$ and $d_3$, respectively; the capacitance image wave $P_2W_2$ of a touch point $P_2(X_3, Y_6)$ is different from the capacitance image waves $G_1W_1$ and $G_2W_1$ of the intersecting points $G_1(X_1, Y_6)$ and $G_2(X_3, Y_4)$ by $d_4$ and $d_2$, respectively. However, because the magnitudes of $d_1$~$d_4$ are too small, and sensing can be easily affected by noises, multi-touch operations are often mistakenly determined.

In view of these problems, the present invention provides a touch method and device for distinguishing true touch, which improves the problem with multi-touch operations.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

The present invention discloses a touch device for distinguishing true touch, and the touch device includes a touch screen including a plurality of first conductive lines and a plurality of second conductive lines, wherein the first and second conductive lines are electrically isolated from each other and stacked to constitute a plurality of coupling intersections; a driving unit driving the first conductive lines; and a sensing unit determining the first conductive lines touched or approached by a plurality of objects and operatively determining the coupling intersections touched or approached by the objects to determine the position touched or approached by each object when the first conductive lines touched or approached by the objects are driven.

The present invention also discloses a touch device for distinguishing true touch, and the touch device includes a touch screen including a plurality of first conductive lines and a plurality of second conductive lines, wherein the first and second conductive lines are electrically isolated from each other and stacked to constitute a plurality of coupling intersections; a driving unit operatively driving the first conductive lines in a first stage and driving a plurality of selected first conductive lines in a second stage; a sensing unit determining the first conductive lines touched or approached by a plurality of objects, wherein the first conductive lines touched or approached by the objects are the selected first conductive lines. When the selected first conductive lines are driven, the sensing unit operatively determines the coupling intersections touched or approached by the objects to determine the position touched or approached by each object.

The present invention also discloses a touch device for distinguishing true touch, and the touch device includes a touch screen including a plurality of first conductive lines and a plurality of second conductive lines electrically isolated from each other and stacked to constitute a plurality of coupling intersections; a driving unit operatively driving the first and second conductive lines in a first stage and driving a plurality of selected first conductive lines in a second stage; and a sensing unit determining the first and second conductive lines touched or approached by a plurality of objects, wherein the first and second conductive lines touched or approached by the objects are operatively the selected first conductive lines and a plurality of second conductive lines. When the selected first conductive lines are driven, the sensing unit operatively senses the selected second conductive lines to determine the coupling intersections touched or approached by the objects.

The present invention also discloses a touch method for distinguishing true touch, and the touch method includes the following steps: driving a plurality of first conductive lines operatively, wherein the first conductive lines and a plurality of second conductive lines are electrically isolated from each other and stacked to constitute a plurality of coupling intersections; determining the first conductive lines touched or approached by a plurality of objects; and determining simultaneously the coupling intersections touched or approached by the objects to determine the position touched or approached by each object when the first conductive lines touched or approached by the objects are driven.

The present invention also discloses a touch method for distinguishing true touch, and the touch method includes the following steps: driving a plurality of first conductive lines operatively, wherein the first conductive lines and a plurality of second conductive lines are electrically isolated from each other and stacked to constitute a plurality of coupling intersections; determining the first conductive lines touched or approached by a plurality of objects, and the first conductive lines touched or approached by the objects are a plurality of selected first conductive lines; and driving the selected first conductive lines operatively, wherein the coupling intersections touched or approached by the objects are operatively determined to determine the position touched or approached by each object when the selected first conductive lines are driven.

The present invention also discloses a touch method for distinguishing true touch, and the touch method includes the following steps: driving a plurality of first conductive lines and a plurality of second conductive lines operatively, wherein the first and second conductive lines are electrically isolated from each other and stacked to constitute a plurality of coupling intersections; determining the first and second conductive lines touched or approached by a plurality of objects, and the first and second conductive lines touched or approached by the objects are a plurality of selected first and second conductive lines; and driving the selected first conductive lines operatively and operatively determining the coupling intersections touched or approached by the objects on the selected second conductive lines so as to determine the position touched or approached by each object.

BRIEF DESCRIPTION OF THE DRAWINGS

The accompanying drawings incorporated in and forming a part of the specification illustrate several aspects of the present invention, and together with the description serve to explain the principles of the disclosure. In the drawings:

FIG. 3A is a flowchart illustrating steps according to a preferred embodiment of the present invention;

FIG. 3B is a flowchart illustrating steps according to another preferred embodiment of the present invention;

DETAILED DESCRIPTION OF THE PREFERRED EMBODIMENTS

Figure 1:
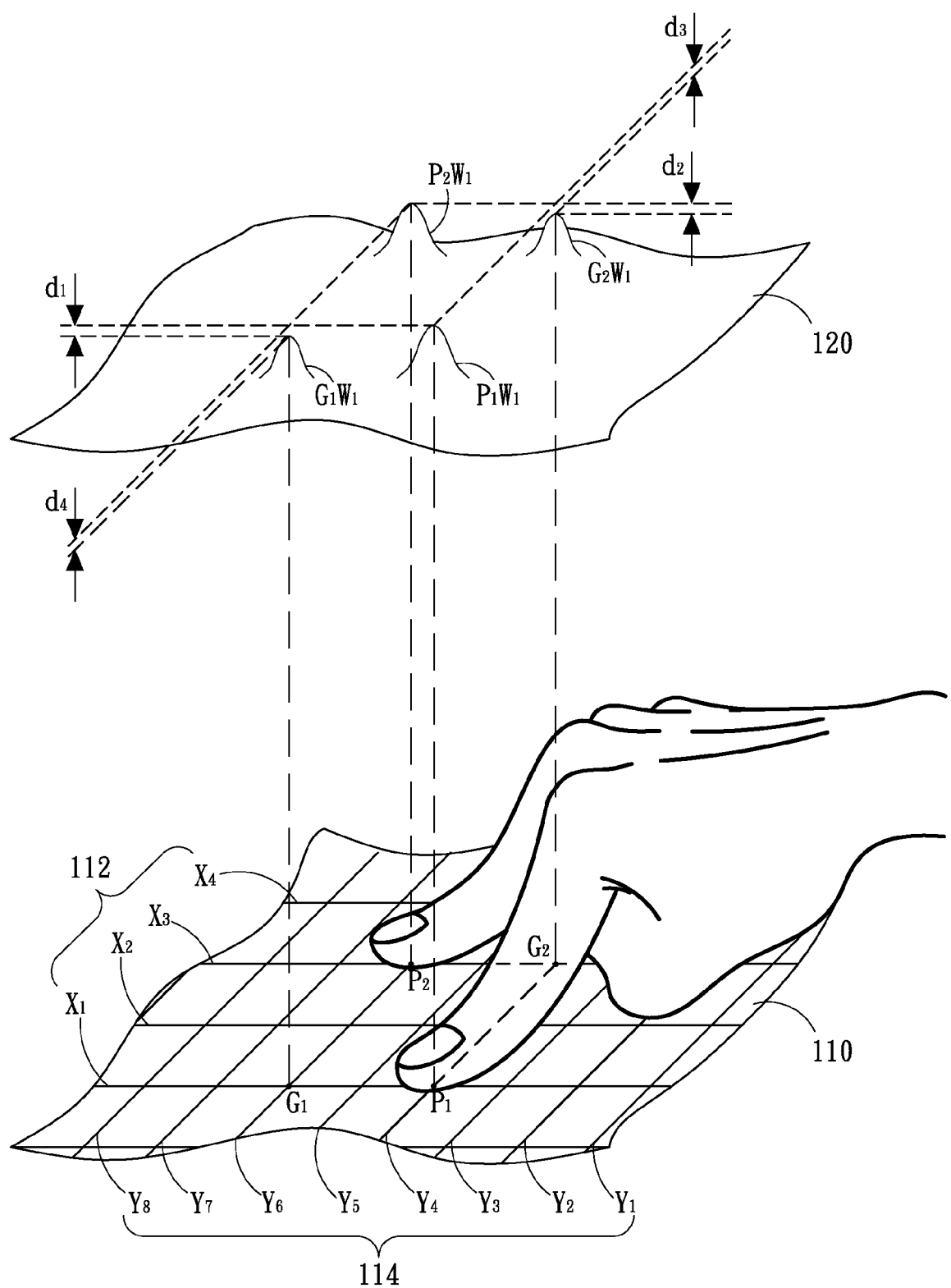
FIG. 1 is a diagram depicting a prior-art touch panel with multi-touch operations and a capacitance image.

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 2A:
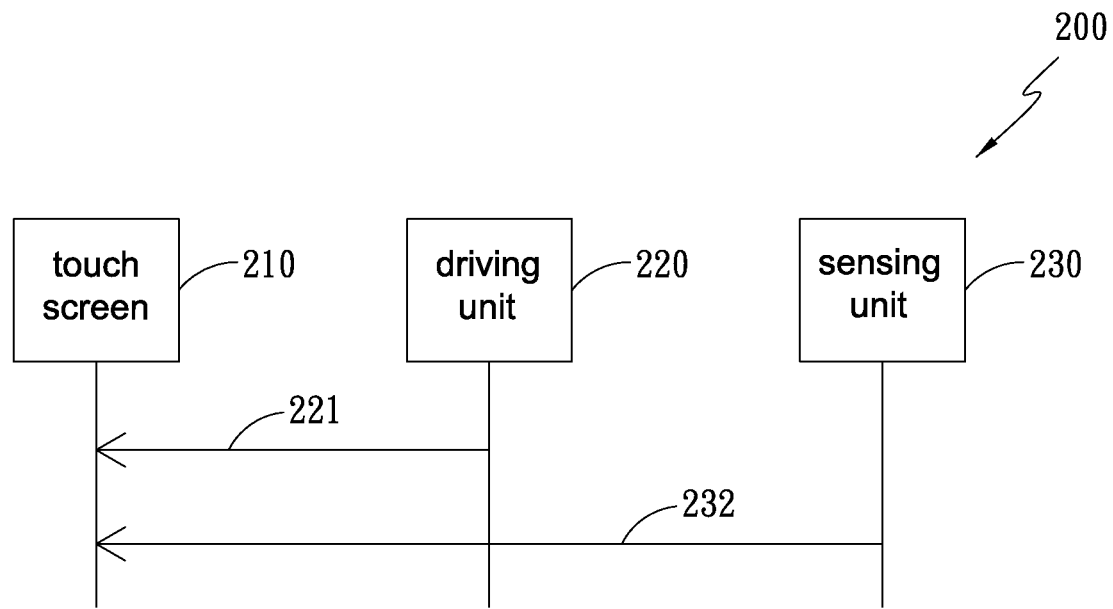
FIG. 2 is a schematic block diagram illustrating a system and a flowchart illustrating steps thereof according to a preferred embodiment of the present invention.
FIG. 2B is a diagram illustrating a system shown in FIG. 2A and a flowchart illustrating steps thereof according to another two preferred embodiments of the present invention.

Referring to FIG. 2A, a schematic block diagram illustrating a system and a flowchart illustrating steps thereof according to a preferred embodiment 200 of the present invention is shown. A touch screen 210 includes a plurality of first conductive lines and a plurality of second conductive lines, and the first and second conductive lines are electrically isolated from each other and stacked to constitute a plurality of coupling intersections. A driving unit 220 operatively drives the first conductive lines, as step 221. A sensing unit 230 determines the first conductive lines touched or approached by a plurality of objects and operatively determines the coupling intersections touched or approached by the objects, as step 232, to determine the position touched or approached by each object when the first conductive lines touched or approached by the objects are driven. In this embodiment, the first conductive lines touched or approached by the objects are determined by the comparison between the self capacitive coupling variation of the first conductive lines and a first threshold, and the coupling intersections touched or approached by the objects are determined by the comparison between the mutual capacitive coupling variation of the coupling intersections and a second threshold, wherein the first and second thresholds could be comparable values preset according to practical application.

Referring to 2B, a diagram illustrating a system shown in FIG. 2A and a flowchart illustrating steps thereof according to another preferred embodiment of the present invention is shown. A touch screen 210 includes a plurality of first and second conductive lines electrically isolated from each other and stacked to constitute a plurality of coupling intersections. A driving unit 220 operatively drives the first conductive lines in a first stage, as step 223, and drives a plurality of selected first conductive lines in a second stage, as step 225. A sensing unit 230 determines the first conductive lines touched or approached by a plurality of objects, as step 234, wherein the first conductive lines touched or approached by the objects are the selected first conductive lines. When the selected first conductive lines are driven, the sensing unit 230 operatively determines the coupling intersections touched or approached by the objects, as step 236, to determine the position touched or approached by each object. In this embodiment, the selected first conductive lines are determined by the comparison between the self capacitive coupling variation of the first conductive lines and a first threshold, and the coupling intersections touched or approached by the objects are determined by the comparison between the mutual capacitive coupling variation of the coupling intersections and a second threshold, wherein the first and second thresholds could be comparable values preset according to practical application.

Figure 2B:
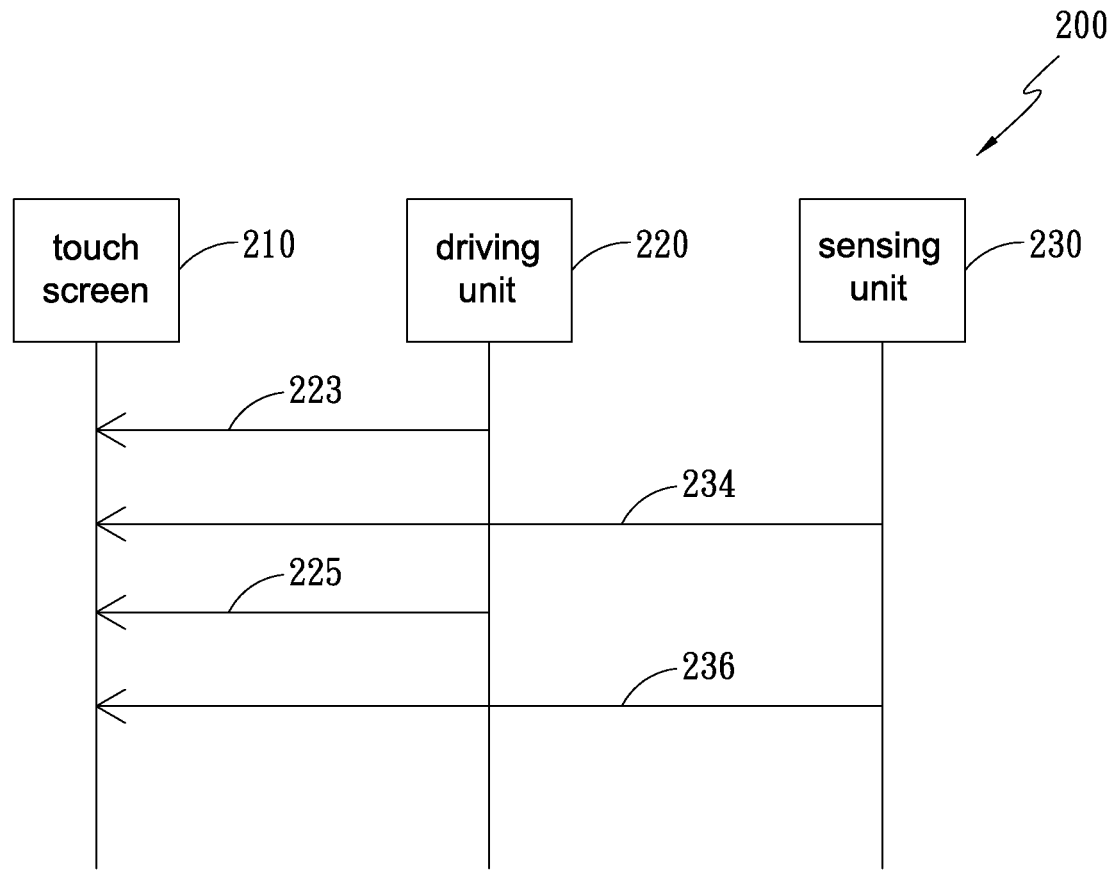

Referring to FIG. 2B again, a diagram illustrating a system shown in FIG. 2A and a flowchart illustrating steps thereof according to yet another preferred embodiment of the present invention is shown. A touch screen 210 includes a plurality of first and second conductive lines electrically isolated from each other and stacked to constitute a plurality of coupling intersections. A driving unit 220 operatively drives the first and second conductive lines in a first stage, as step 223, and drives a plurality of selected first conductive lines in a second stage, as step 225. A sensing unit 230 determines the first and second conductive lines touched or approached by a plurality of objects, as step 234, wherein the first and second conductive lines touched or approached by the objects are operatively the selected first and second conductive lines. When the selected first conductive lines are driven, the sensing unit 230 operatively senses the selected second conductive lines, as step 236, to determine the coupling intersections touched or approached by the objects. In this embodiment, the selected first conductive lines are determined by the comparison between the self capacitive coupling variation of the first conductive lines and a first threshold; the selected second conductive lines are determined by the comparison between the self capacitive coupling variation of the selected second conductive lines and a third threshold; and the coupling intersections touched or approached by the objects are determined by the comparison between the mutual capacitive coupling variation of the coupling intersections and a fourth threshold, wherein the first, third and fourth thresholds could be comparable values preset according to practical application.

When the number of objects are two, the selected first and second conductive lines determine two groups of true touch points and two groups of false touch points, and the two groups of true and false touch points are separately on the diagonals of a virtual parallelogram, wherein the sensing unit 230 determines the coupling intersections touched or approached by the objects from at least one of the two groups of true and false touch points in the second stage (e.g. step 225, 236). The mutual capacitive coupling variation of the two groups of true touch points exceed a fifth threshold, and the mutual capacitive coupling variation of the two groups of false touch points are less than or equal to the fifth threshold. In this embodiment, the fifth thresholds could be comparable values preset according to practical application.

Referring to FIG. 3A, a flowchart illustrating steps according to a preferred embodiment of the present invention is shown. Referring to descriptions associated with FIG. 2A at the same time, in step 312, the driving unit 220 operatively drives a plurality of first conductive lines of the touch screen 210, and the first conductive lines and a plurality of second conductive lines are electrically isolated from each other and stacked to constitute a plurality of coupling intersections. In step 314, the sensing unit 230 determines the first conductive lines touched or approached by a plurality of objects. When the first conductive lines touched or approached by the objects are driven by the driving unit 220, the sensing unit 230 simultaneously determines the coupling intersections touched or approached by the objects, as step 316, to determine the position touched or approached by each object. In this embodiment, the first conductive lines touched or approached by the objects are determined by the comparison between the self capacitive coupling variation of the first conductive lines and a first threshold, and the coupling intersections touched or approached by the objects are determined by the comparison between the mutual capacitive coupling variation of the coupling intersections and a second threshold.

Referring to FIG. 3B, a flowchart illustrating steps according to another preferred embodiment of the present invention is shown. Referring to descriptions associated with FIG. 2B at the same time, in step 322, the driving unit 220 operatively drives a plurality of first conductive lines of the touch screen 210, and the first conductive lines and a plurality of second conductive lines are electrically isolated from each other and stacked to constitute a plurality of coupling intersections. In step 324, the sensing unit 230 determines the first conductive lines touched or approached by a plurality of objects, and the first conductive lines touched or approached by the objects are a plurality of selected first conductive lines. In step 326, the driving unit 220 operatively drives the selected first conductive lines, and when the selected first conductive lines are operatively driven by the driving unit 220, the sensing unit 230 operatively determines the coupling intersections touched or approached by the objects so as to determine the position touched or approached by each object. the selected first conductive lines are determined by the comparison between the self capacitive coupling variation of the first conductive lines and a first threshold, and the coupling intersections touched or approached by the objects are determined by the comparison between the mutual capacitive coupling variation of the coupling intersections and a second threshold.

Figure 3C:
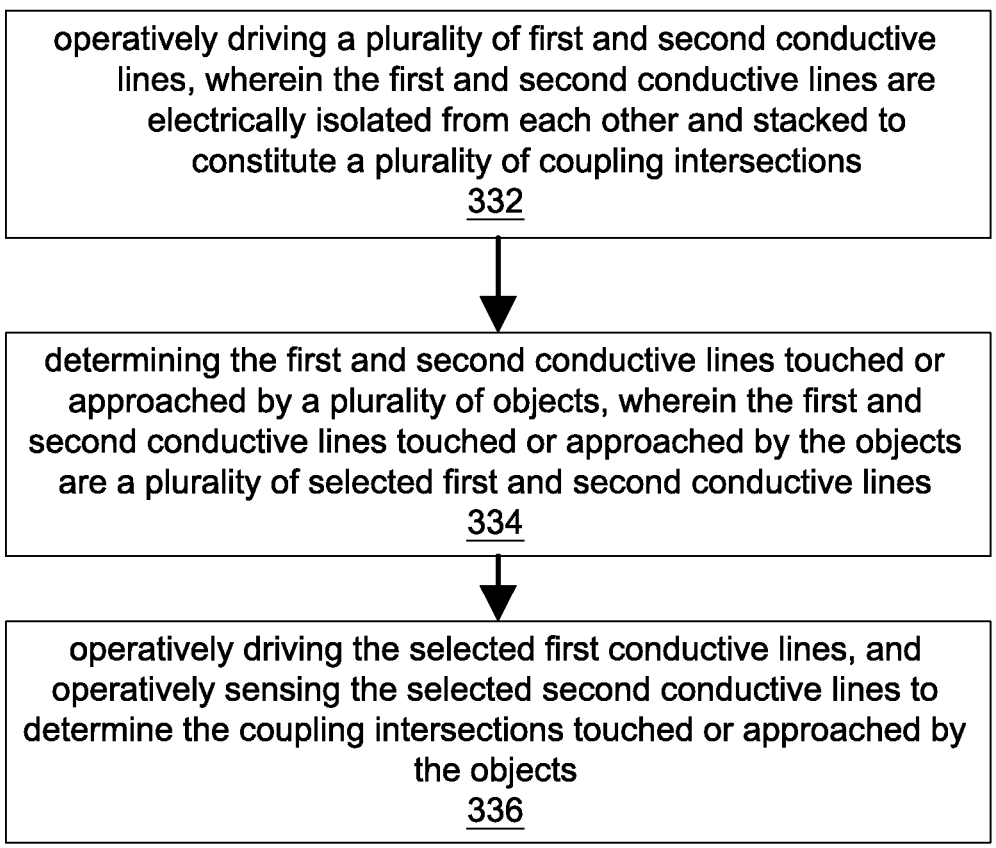
FIG. 3C is a flowchart illustrating steps according to yet preferred embodiment of the present invention.

Referring to FIG. 3C, a flowchart illustrating steps according to yet another preferred embodiment of the present invention is shown. Referring to descriptions associated with FIG. 2B at the same time, in step 332, the driving unit 220 operatively drives a plurality of first and second conductive lines of the touch screen 210, and the first and second conductive lines are electrically isolated from each other and stacked to constitute a plurality of coupling intersections. In step 334, the sensing unit 230 determines the first and second conductive lines touched or approached by a plurality of objects, and the first and second conductive lines touched or approached by the objects are a plurality of selected first and second conductive lines. In step 336, the driving unit 220 operatively drives the selected first conductive lines, and when the selected second conductive lines are operatively driven, the sensing unit 230 operatively senses the selected second conductive lines to determine the coupling intersections touched or approached by the objects. In this embodiment, the selected first conductive lines are determined by the comparison between the self capacitive coupling variation of the first conductive lines and a first threshold; the selected second conductive lines are determined by the comparison between the self capacitive coupling variation of the selected second conductive lines and a third threshold; and the coupling intersections touched or approached by the objects are determined by the comparison between the mutual capacitive coupling variation of the coupling intersections and a fourth threshold.

When the number of objects are two, two groups of true touch points and two groups of false touch points are determined according to the selected first and second conductive lines, and the two groups of true and false touch points are separately on the diagonals of a virtual parallelogram, wherein the sensing unit 230 determines at least one coupling intersections touched or approached according to the objects of the two groups of true and false touch points in the second stage (e.g. step 336). The mutual capacitive coupling variation of the two groups of true touch points exceed a fifth threshold, and the mutual capacitive coupling variation of the two groups of false touch points are less than or equal to the fifth threshold.

Figure 4:
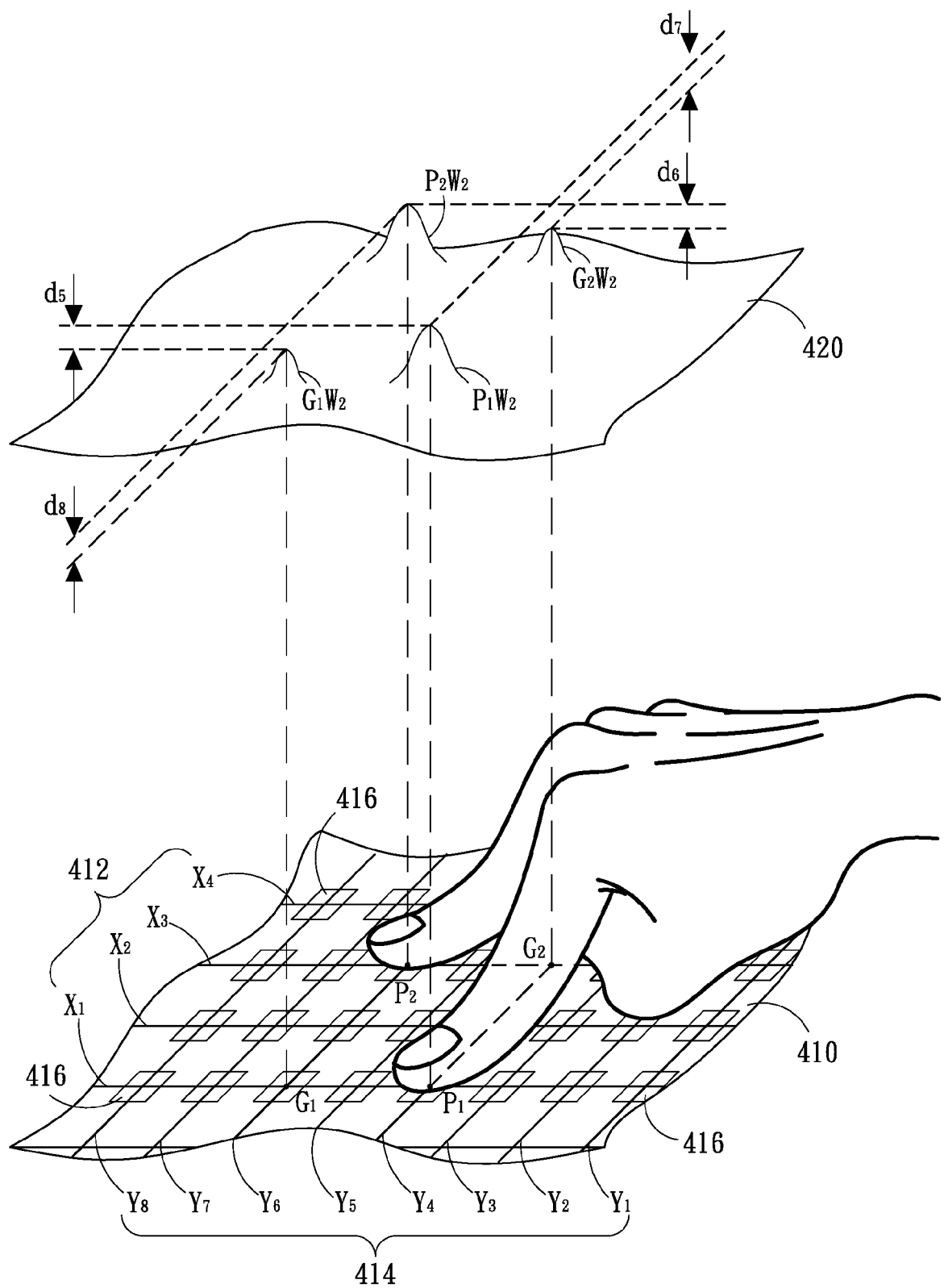
FIG. 4 is a diagram depicting multi-touch operations and a capacitance image according to a preferred embodiment of the present invention.

Referring to FIG. 4, a diagram depicting multi-touch operations and a capacitance image according to a preferred embodiment of the present invention is shown. A touch screen 410 includes a plurality of first conductive lines 412 and a plurality of second conductive lines 414, and the first conductive lines 412 and the second conductive lines 414 are stacked on and electrically isolated from each other. A plurality of electrical conductor 416 operatively crosses each pair of intersecting first conductive lines 412 and second conductive lines 414, and provided around the coupling intersections of the first conductive lines 212 and second conductive lines 214.

When there are two touch points $P_1$ and $P_2$ on the touch screen 410, there will be a current or voltage change at $P_1$ and $P_2$ as well as $G_1$ and $G_2$. Refer to the capacitance image 420 for further illustration, the capacitance image wave $P_1 W_2$ of a touch point $P_1(X_1, Y_4)$ is different from the capacitance image waves $G_1 W_2$ and $G_2 W_2$ of intersecting points $G_1(X_1, Y_6)$ and $G_2(X_3, Y_4)$ by $d_5$ and $d_7$, respectively; the capacitance image wave $P_2 W_2$ of a touch point $P_2(X_3, Y_6)$ is different from the capacitance image waves $G_1W_2$ and $G_2W_2$ of the intersecting points $G_1(X_1, Y_6)$ and $G_2(X_3, Y_4)$ by $d_6$ and $d_8$, respectively. However, the magnitudes of $d_5$~$d_8$ are much larger than those of $d_1$~$d_4$ shown in FIG. 1. The current or voltage change is obtained from prior art by sensing a single mutual capacitance change between the first and second conductive lines 412 and 414, while in this embodiment, the current or voltage change is obtained by sensing three-mutual-capacitance compound change between the first and second conductive lines 412 and 414, the first and second conductive lines 412 and 416 and the second conductive line 414 and electrical conductor 416, as a result, the three-mutual-capacitance compound change is significantly larger than the single mutual capacitance change. Thereby, the touch points $P_1$ and $P_2$ can be clearly distinguished from the intersecting (or ghost) points $G_1$ and $G_2$.

It should be noted that the present embodiment is illustrated in the context of two touch points; however, situations of more than two touch points can be easily envisaged by one with ordinary skills in the art. In other words, any two touch points can form a pair of real vertices on a diagonal of a virtual parallelogram (e.g. a rectangular or rhombus), such as $P_1$ and $P_2$. On the contrary, a pair of pseudo vertices is on the other diagonal of the virtual parallelogram, such as $G_1$ and $G_2$. The electrical conductor 416 increases the signal differences between the intersecting points around the real vertices and the intersecting points around the pseudo vertices. In addition, the dimension of the electrical conductor 416 determines the signal differences between the intersecting points around the real vertices and the intersecting points around the pseudo vertices. Assuming that the path of the conductor is constant, the larger the electrical conductor 416, the larger the difference between the intersecting points around the real vertices and the intersecting points around the pseudo vertices, and vice versa. It can be appreciated that the relationship between the dimension of the conductor 416 and the signal difference between the intersecting points around the real vertices and the intersecting points around the pseudo vertices is not necessary linear. Moreover, due to variations in the distances between real or pseudo vertices and the neighboring intersecting points, the number of intersecting points generating a mutual capacitance may vary. There may be one or more of these intersecting points around each vertex that generates a mutual capacitance compound change. For simplicity, in FIG. 4, there is only one intersecting point near each vertex that generates the mutual capacitance compound change, but the present invention is not limited to this. In other embodiments of the present invention, there can be one or more neighboring intersecting points that contribute to the mutual capacitance compound change.

It should be noted that since sensing of a three-mutual-capacitance compound change is easier (larger and more obvious) than sensing of a single mutual capacitance change. Thus, embodiments of the present invention can achieve similar resolution with fewer conductive lines. In addition, the determined data for determining a touch event or not is not limited to digital data, so analog data can be determined and used to estimate the pressure at a touched location. If a finger or a flexible material suppresses a touch screen 410, the greater the force of suppression, the larger the area of contact between the finger or material and the touch screen 410, and in turns the larger the mutual capacitance compound change. When determining a touch event, the magnitude, variation, variation trend of the pressure can also be determined, which can be used to identify gestures associated with pressure or pressure variation, for example, identify an approaching or leaving finger based on an increasing or decreasing pressure trend, or identify movement of a finger based on pressures increased at one side and decreased at the other side of the finger.

Thus, when touch screen 210 comprises a plurality of electrical conductors 416 correspondingly crossing the coupling intersections, the dimension of the electrical conductors 416 will determine all the foregoing second, fourth and fifth thresholds.

Figure 5:
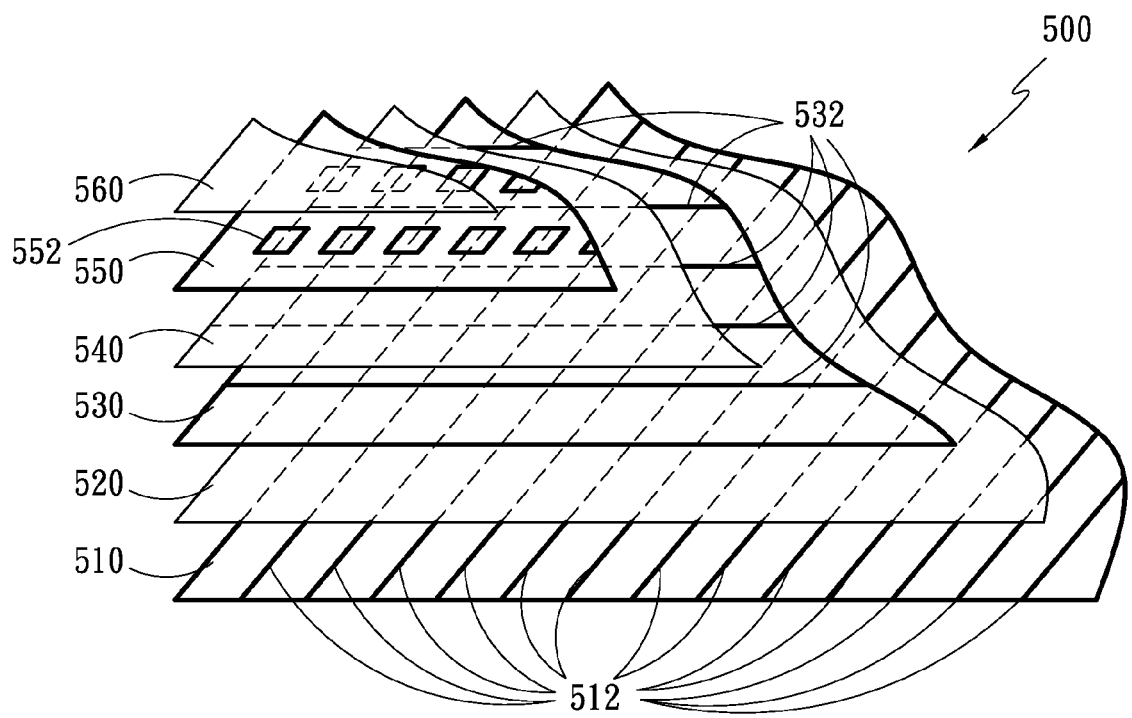
FIG. 5 is a diagram depicting decomposition of a structure 500 of the touch screen according to a preferred embodiment of the present invention.

Referring to FIG. 5, a diagram depicting decomposition of a structure 500 of the touch screen according to a preferred embodiment of the present invention is shown. A plurality of first conductive lines 512 is electrically isolated from each other and on the first axis layer 510. A plurality of second conductive lines 532 is electrically isolated from each other and on the second axis layer 530. The first and second conductive lines 512 and 532 are electrically isolated from and stacked on each other, constituting a plurality of intersecting points. A first dielectric layer 520 is interposed between the first and second conductive lines 512 and 532. The first and second conductive lines 512 and 532 perpendicularly cross each other. A plurality of electrical conductors 552 is electrically isolated from each other and on an electrical conductor layer 550. These conductors 552 each cross a pair of intersecting first and second conductive lines 512 and 532 and are around these intersecting points. The first and second conductive lines 512 and 532 and the electrical conductors 552 are electrically isolated from each other. A second dielectric layer 540 is interposed between the second conductive lines 532 and the electrical conductors 552. A third dielectric layer 560 is provided on top of the first and second conductive lines 512 and 532 and the electrical conductors 552. In this embodiment, the electrical conductors 552 can be alternatively placed between the first and second conductive lines 512 and 532, or beneath them. In a preferred embodiment of the present invention, the relative positions of the conductors 552 are above the first and second conductive lines 512 and 532. In addition, it is appreciated by one skilled in the art that the third dielectric layer 560 is optional. In another embodiment of the present invention, there are only first and second conductive lines 512 and 532, electrical conductors 552, a first dielectric layer 520 and a second dielectric layer 540, wherein the first dielectric layer 520 is interposed between the first and second conductive lines 512 and 532, and the second dielectric layer 540 is interposed between the electrical conductors 552 and the first and second conductive lines 512 and 532. As described before, the relative positions of these conductors 552 can be between the first and second conductive lines 512 and 532 or above or beneath them.

Figure 6:
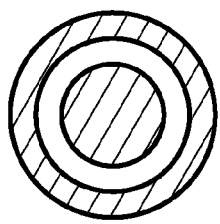
FIG. 6 is a diagram depicting several preferred structures of an electrical conductor according to the present invention.
Figure 6:
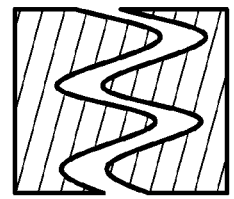
Figure 6:
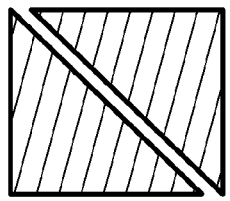
Figure 6:
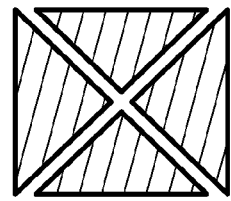

Referring to FIG. 6, a diagram depicting several preferred structures of an electrical conductor according to the present invention is shown. An electrical conductor consists of (a) two concentric circles comprising solid-circular and ring-shape sub-conductors; (b) a rectangular conductor comprising two inner zigzag sub-conductors; (c) a rectangular conductor comprising two triangular sub-conductors; and (d) a rectangular conductor comprising four triangular sub-conductors. The above embodiment is used only to illustrate a few combinations of sub-conductors for forming an electrical conductor; the present invention is not limited to these, but can have one or more elements with any geometric shapes. Thus, an electrical conductor of the present invention can be a single body or a compound body made up of a plurality of separated elements crossing an intersecting point.

In the embodiments of the present invention, the electrical signals transmitted to touch screen from driving unit can be a sinusoidal wave, square wave or other waveforms, and may be provided to the first or second conductive line in fixed current or voltage for detecting the voltage, current or capacitance on the first or second conductive line. That is, the electrical signals are provided as fixed voltage to determine a voltage or current; as fixed current to determine a voltage or current or any of the above methods to determine a capacitance. The present invention does not put a limit on how to measure the first and second sensing signals or the compound signals of the intersecting points.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A touch device for distinguishing true touch, comprising:
    a touch screen, comprising:
        a plurality of first conductive lines; and
        a plurality of second conductive lines, where the first and second conductive lines are electrically isolated from each other and stacked to constitute a plurality of coupling intersections;
        a driving unit operatively driving the first conductive lines; and
        a sensing unit detecting a self capacitive coupling variation of only the first conductive lines to determine the first conductive lines touched or approached by a plurality of objects;
    Wherein the driving unit further drives only the first conductive lines touched or approached by the objects and the sensing unit further only detects a mutual capacitive coupling variation between the first conductive lines touched or approached by the objects and all of the second conductive lines to determine the coupling intersections touched or approached by the objects, so as to determine each position touched or approached by each object.

2. A touch device for distinguishing true touch of claim 1, wherein the first conductive lines touched or approached by the objects are determined by a comparison between the self capacitive coupling variation of the first conductive lines and a threshold.

3. A touch device for distinguishing true touch of claim 1, wherein the coupling intersections touched or approached by the objects are determined by a comparison between a mutual capacitive coupling variation of the coupling intersections and a threshold.

4. A touch device for distinguishing true touch of claim 3, wherein the touch screen further comprises a plurality of electrical conductors crossing the coupling intersections, and a dimension of the electrical conductors determines the threshold.

5. A touch device for distinguishing true touch, comprising:
    a touch screen, comprising:
    a plurality of first conductive lines; and
    a plurality of second conductive lines, where the first and second conductive lines are electrically isolated from each other and stacked to constitute a plurality of coupling intersections;
    a driving unit driving the first conductive lines in a first stage; and
    a sensing unit detecting a self capacitive coupling variation of only the first conductive lines to determine the first conductive lines touched or approached by a plurality of objects, wherein the first conductive lines touched or approached by the objects are the selected first conductive lines;
    wherein the driving unit further drives only the first conductive lines touched or approached by the objects in a second stage and the sensing unit further determines the coupling intersections touched or approached by the objects, so as to determine each position touched or approached by each object,
    wherein the sensing unit further determines the coupling intersections touched or approached by the objects in the second stage by only detecting a mutual capacitive coupling variation between the first conductive lines touched or approached by the objects and all of the second conductive lines.

6. A touch device for distinguishing true touch of claim 5, wherein the selected first conductive lines are determined by a comparison between the self capacitive coupling variation of the first conductive lines and a threshold.

7. A touch device for distinguishing true touch of claim 5, wherein a mutual capacitive coupling variation of the coupling intersections touched or approached by the objects are determined by a comparison between the mutual capacitive coupling variation and a threshold.

8. A touch device for distinguishing true touch of claim 1, wherein the touch screen further comprises a plurality of electrical conductors crossing the coupling intersections, and a dimension of the electrical conductors determines the threshold.

9. A touch device for distinguishing true touch of claim 5, wherein the driving unit further drives the second conductive lines in the first stage, and the sensing unit further determines the second conductive lines touched or approached by the objects in the first stage, wherein the second conductive lines touched or approached by the objects are a plurality of selected second conductive lines, and the sensing unit operatively senses the selected second conductive lines to determine the coupling intersections touched or approached by the objects when the selected first conductive lines are driven.

10. A touch device for distinguishing true touch of claim 9, wherein the selected second conductive lines are determined by a comparison between a self capacitive coupling variation of the selected second conductive lines and a threshold.

11. A touch device for distinguishing true touch of claim 9, wherein the coupling intersections touched or approached by the objects are determined by a comparison between a mutual capacitive coupling variation of the coupling intersections and another threshold.

12. A touch device for distinguishing true touch of claim 11, wherein touch screen further comprises a plurality of electrical conductors crossing the coupling intersections, and a dimension of the electrical conductors determines the another threshold.

13. A touch device for distinguishing true touch of claim 5, wherein the driving unit further drives the second conductive lines in the first stage, and the sensing unit further determines the second conductive lines touched or approached by the objects in the first stage, wherein the second conductive lines touched or approached by the objects are a plurality of selected second conductive lines, and the selected first and second conductive lines determine two groups of true touch points and two groups of false touch points when the number of objects are two, wherein the two groups of true and false touch points are separately on the diagonals of a virtual parallelogram, and the sensing unit determines the coupling intersections touched or approached by the objects from at least one of the two groups of true and false touch points in the second stage.

14. A touch device for distinguishing true touch of claim 13, wherein a mutual capacitive coupling variation of the two groups of true touch points exceed a threshold, and a mutual capacitive coupling variation of the two groups of false touch points are less than or equal to the threshold.

15. A touch device for distinguishing true touch of claim 14, wherein the touch screen further comprises a plurality of electrical conductors crossing the coupling intersections, and a dimension of the electrical conductors determines the threshold.

16. A touch method for distinguishing true touch, comprising:
operatively driving a plurality of first conductive lines, wherein the first conductive lines and a plurality of second conductive lines are electrically isolated from each other and stacked to constitute a plurality of coupling intersections;
determining the first conductive lines touched or approached by a plurality of objects by detecting a self capacitive coupling variation of only the first conductive lines; and
determining the coupling intersections touched or approached by the objects by further driving only the first conductive lines touched or approached by the objects and further only detecting a mutual capacitive coupling variation between the first conductive lines touched or approached by the objects and all of the second conductive lines.

17. A touch method for distinguishing true touch of claim 16, wherein the first conductive lines touched or approached by the objects are determined by a comparison between the self capacitive coupling variation of the first conductive lines and a threshold.

18. A touch method for distinguishing true touch of claim 16, wherein the coupling intersections touched or approached by the objects are determined by a comparison between a mutual capacitive coupling variation of the coupling intersections and an another threshold.

19. A touch method for distinguishing true touch of claim 18, further comprising:
providing a plurality of electrical conductors cross the coupling intersections for determining the another threshold according to a dimension of the electrical conductors.

20. A touch method for distinguishing true touch, comprising:
driving a plurality of first conductive lines operatively, wherein the first conductive lines and a plurality of second conductive lines are electrically isolated from each other and stacked to constitute a plurality of coupling intersections;
determining the first conductive lines touched or approached by a plurality of objects by detecting a self capacitive coupling variation of only the first conductive lines, and the first conductive lines touched or approached by the objects are a plurality of selected first conductive lines; and
driving only the first conductive lines touched or approached by the objects;
determining the coupling intersections touched or approached by the objects, so as to determine each position touched or approached by each object,
wherein the coupling intersections touched or approached by the objects are determined by only detecting a mutual capacitive coupling variation between the first conductive lines touched or approached by the objects and all of the second conductive lines.

21. A touch method for distinguishing true touch of claim 20, wherein the selected first conductive lines are determined by a comparison between the self capacitive coupling variation of the first conductive lines and a threshold.

22. A touch method for distinguishing true touch of claim 20, wherein a mutual capacitive coupling variation of the coupling intersections touched or approached by the objects are determined by a comparison between the mutual capacitive coupling variation and a threshold.

23. A touch method for distinguishing true touch of claim 22, further comprising: providing a plurality of electrical conductors cross the coupling intersections for determining the threshold according to a dimension of the electrical conductors.

24. A touch method for distinguishing true touch of claim 20, further comprising:
operatively driving the second conductive lines;
determining the second conductive lines touched or approached by the objects, wherein the second conductive lines touched or approached by the objects are a plurality of selected second conductive lines; and
determining the coupling intersections touched or approached by the objects on the selected second conductive lines when the selected second conductive lines are driven.

25. A touch method for distinguishing true touch of claim 24, wherein the selected second conductive lines are determined by the comparison between a self capacitive coupling variation of the selected second conductive lines and a threshold.

26. A touch method for distinguishing true touch of claim 24, wherein the coupling intersections touched or approached by the objects are determined by a comparison between a mutual capacitive coupling variation of the coupling intersections and an another threshold.

27. A touch method for distinguishing true touch of claim 26, further comprising: providing a plurality of electrical conductors cross the coupling intersections for determining the an additional threshold according to a dimension of the electrical conductors.

28. A touch method for distinguishing true touch of claim 20, further comprising:
operatively driving the second conductive lines;
determining the second conductive lines touched or approached by the object, wherein the second conductive lines touched or approached by the object are a plurality of selected second conductive lines;
determining two groups of true touch points and two groups of false touch points according to the selected first and second conductive lines when the number of objects are two, wherein the two groups of true and false touch points are separately on the diagonals of a virtual parallelogram; and determining at least one group of coupling intersections touched or approached according to the objects of the two groups of true and false touch points.

29. A touch method for distinguishing true touch of claim 28, wherein a mutual capacitive coupling variation of the two groups of true touch points exceed an threshold, and a mutual capacitive coupling variation of the two groups of false touch points are less than or equal to the threshold.

30. A touch method for distinguishing true touch of claim 29, further comprising: providing a plurality of electrical conductors cross the coupling intersections for determining the threshold according to a dimension of the electrical conductors.

* * * * *